United States Patent [19]

Kozmik et al.

[11] Patent Number: 5,368,957
[45] Date of Patent: Nov. 29, 1994

[54] ENERGY STORAGE DEVICE

[75] Inventors: Ivan D. Kozmik, Chernovtsy; Kornei D. Tovstjuk, Lvov; Zahar D. Kovalyuk, Cheznovtsy; Ivan I. Grigortchak, Ivano-Frankovsk Region; Elvria G. Krigan, Chernovtsy; Bogdan P. Bahmatyuk, Ivano-Frankovsk Region, all of Ukraine

[73] Assignee: I. N. Frantsevich Institute for Problems in Materials Science, Kiev, Ukraine

[21] Appl. No.: 968,183

[22] Filed: Oct. 29, 1992

Related U.S. Application Data

[63] Continuation-in-part of Ser. No. 783,886, Oct. 29, 1991, abandoned.

[51] Int. Cl.$^5$ .............................................. H01M 4/58
[52] U.S. Cl. ..................................... 429/194; 429/218; 429/220
[58] Field of Search ............... 429/194, 196, 197, 220, 429/218

[56] References Cited

U.S. PATENT DOCUMENTS

| | | |
|---|---|---|
| 3,688,109 | 8/1972 | Gamble . |
| 3,877,988 | 4/1975 | Dey et al. . |
| 3,933,688 | 1/1976 | Dines . |
| 4,049,887 | 9/1977 | Whittingham . |
| 4,085,259 | 4/1978 | Lauck . |
| 4,203,861 | 5/1980 | Thorp et al. . |
| 4,229,509 | 10/1980 | Margalit . |
| 4,268,588 | 5/1981 | Lecerf et al. . |
| 4,288,508 | 9/1981 | Basu et al. . |
| 4,309,491 | 1/1982 | Brec et al. . |
| 4,385,103 | 5/1983 | Louzos et al. . |
| 4,490,448 | 12/1984 | Williamson, III . |
| 4,720,910 | 1/1988 | Rourke et al. . |

FOREIGN PATENT DOCUMENTS 2106704  4/1983  United Kingdom .

OTHER PUBLICATIONS

"Studies of Lithium Insertion in Bismuth Chalcogenicde Compounds" by C. Julien et al. *Solid State Ionics* 36 (½), 113–120 (Oct., 1989).

"Study of Lithium Intercalation in Bismuth Diselenide" by K. M. Paraskevopoulos et al. *Microionics–Solid State*, pp. 343–361 (Elsevier Science Publishers B.V.) (1991) (month not available).

"Charge Distribution of Electrons at Intercalated Atoms in Layer Crystals" by B. A. Lukiyanets. *Phys. Stat. Sol*(b), vol. 163, 171 (1991) (month not available).

"Change in the Electronic Subsystem Energy by Intercalation of Layered Crystals" by M. R. Omelyan et al. *Phys. Stat. Sol.*(b) 159, K73 (1990) (month not available).

"A Cyclable Lithium Organic Electrolyte Cell Based on Two Intercalation Electrodes" by M. Lazzari et al. *J. Electrochem. Soc.* 773–774 (Mar., 1980) (month not available).

(List continued on next page.)

*Primary Examiner*—Anthony Skapars
*Attorney, Agent, or Firm*—Choate, Hall & Stewart

[57] ABSTRACT

An energy storage device with improved capacity contains an anode from the Group Ia elements, an electrolyte capable of ion transport of anode species and a cathode comprising a layered crystalline material of the formula $G_xMe_yCh_z$, where G is at least one guest element selected from the Group Ia elements and $0.0 \leq x \leq 10$; Me is selected from the group containing Bi and Sb and y=1, 2; and Ch is a chalcogenide element selected from the group containing S, Se and Te, and z=1, 2, 3. The layered crystalline material is characterized in that is has a sufficiently low defect density and appropriate impurity distribution, together sufficient to permit intercalation of at least 3 moles of lithium within van der Waals channels per one mole of said material without significant distortion of the lattice, said material further characterized in that the change in Gibbs free energy is substantially independent of the lithium intercalant concentration.

43 Claims, 3 Drawing Sheets

OTHER PUBLICATIONS

"Conductivity Along the O-Axis of Layered Crystals During their Intercalation" by B. A. Lukiyanets et al. *Chem. Abs.* 114:133617a (1990) (month not available).

"Effect of Intercalation by Lithium on Fermi-Level Position and Free Charge-Carrier Concentration in Bismuth Telluride" by I. Grigortchak et al. Chem. Abs. 112:1895386 (1989) (month not available).

T. Yamamoto et al., "Lithium Secondary Battery Using Monoclinic $NbS_3$ Prepared Under High Pressure" *J. Electrochem. Soc.*, 133:8, 1558–1561 (Aug. 1986).

S. N. Chizhevskaya et al. "Effect of Preparation on the Mechanical and Thermoelectric Properties of $Bi_2Te_{3-x}Se_x$ Alloys" 6001 *Chemical Abstracts*, 110:22, 162 (May 29, 1989).

és of the existing energy storage system using metal chalcogenides as the electroactive species is the strong dependence of the battery performance on the intercalant concentration, resulting in operation conditions changing with time. "Loading" or "loading capacity" is defined herein as moles of guest species per mole of host material; it should also be noted that "species" is defined to include both ions and uncharged atoms of the Group Ia elements.

ENERGY STORAGE DEVICE

This application is a continuation-in-part application of U.S. Ser. No. 07/783,886 filed Oct. 29, 1991, now abandoned.

BACKGROUND OF THE INVENTION

This invention relates to a high capacity energy storage device. The invention further relates to novel cathode materials.

It is well known that layered structures can be intercalated with small ions such as lithium, sodium and potassium. In particular, layered transition and main group metal chalcogenides have been used with lithium intercalant in electrochemical cells. It is recognized that increased loading capacity of the intercalant into the layered material would significantly improve device performance and battery capacity. Another limitation of the existing energy storage system using metal chalcogenides as the electroactive species is the strong dependence of the battery performance on the intercalant concentration, resulting in operation conditions changing with time. "Loading" or "loading capacity" is defined herein as moles of guest species per mole of host material; it should also be noted that "species" is defined to include both ions and uncharged atoms of the Group Ia elements.

Distortion of the metal chalcogenide layers has been used as a means of increasing the channel width and thereby increasing guest loading. U.S. Pat. No. 4,288,508 reports a cathode active material for a battery having the general formula $Li_zNa_yTiS_2$, where y is preferable 0.15–0.20 and z can range as high as 3.25. Increased loading is accomplished by using the larger sodium atom to pry open the van der Waals channels. This results in significant distortion of the $TiS_2$ lattice.

U.S. Pat. No. 4,309,491 reports a solid solution containing a bismuth chalcogenide for use as a cathode active material. The guest loading in the bismuth chalcogenide is reported to require up to six Faradays of electrons, suggesting that six moles of guest are intercalated. However, it is also reported that there is substantial dependence of the discharge voltage on the guest concentration.

It is the object of the present invention to provide a high capacity energy storage system whose performance is constant over time and changing intercalant concentration.

It is a further object of the present invention to provide an energy storage device including a metal chalcogenide cathode material capable of achieving high guest loading without the disadvantages of the prior art.

SUMMARY OF THE INVENTION

The present invention has determined that a certain class of highly defect-free crystalline materials with the appropriate impurity distribution can be used in a battery with dramatic improvement of capacity and stability.

In one aspect of the present invention, an energy storage device is provided containing an anode including at least one species selected from the group containing Group Ia elements, an electrolyte capable of transporting an anode species through the electrolyte, and a cathode comprising a layered crystalline material of the formula $G_xMe_yCh_z$, where G is at least one guest element is selected from the Group Ia elements of the Periodic Table, and $0.0 \leq x \leq 0.4$; Me is selected from the group containing Bi and Sb and y=1 or 2; and Ch is a chalcogenide selected from the group containing S, Se and Te and z=1, 2 or 3. Both electrodes are in contact with the electrolyte. The material is further characterized in that it has a sufficiently low defect density and an appropriate impurity distribution, together sufficient to permit intercalation of at least 3 moles of lithium within van der Waals channels per one mole of said material without significant distortion of the lattice and that the change in Gibbs free energy ($\Delta G$) of the material is substantially independent of the lithium intercalation concentration. Further detail concerning intercalation compounds and devices using these compounds are given in the following applications, filed on equal date as "Energy Storage Device", and incorporated herein by reference: "Layered Crystalline Material Capable of High Guest Loading", "Electrolytic Double Layer Capacitor", and "Capacitive Thermoelectric Device".

In preferred embodiments, the cathode can be a solid solution or composite material of two or more compounds of the layered crystalline material. The anode can include electroactive species selected from the group comprising lithium, sodium and potassium and alloys with other materials. The anode may also be a lithium intercalated material, such as carbon, which is particularly preferred for reversible processes.

In a preferred embodiment, the energy storage device is discharged by the intercalation of the anode species (G) into the van der Waals channels of the cathode to form $G_xMe_yCh_z$, where the source of G is the anode and $0.4 < x \leq 10$. The energy storage device preferably includes a lithium anode, a lithium perchlorate electrolyte solution and a cathode containing $Li_xBi_2Ch_3$, where $0.0 \leq x \leq 10$. The anode species functions as a guest particle in the van der Waals channel.

In another aspect of the invention, an energy storage device is provided containing a lithium anode, an electrolyte structure including lithium and having a first surface in contact with the anode, in which the electrolyte structure is made of unwoven polypropylene impregnated with an electrolyte and a cathode in contact with the second surface of the electrolyte structure. The cathode is prepared from a layered crystalline material of the formula $Li_xBi_yCh_z$, where Ch is a chalcogenide element selected from the group containing S, Se and Te and z=1, 2, 3 and $0.0 \leq x \leq 10$. The material is further characterized in that it has a sufficiently low defect density and an appropriate impurity distribution, together sufficient to permit intercalation of at least 3 moles of lithium within van der Waals channels per one mole of said material without significant distortion of the lattice and that the change in Gibbs free energy ($\Delta G$) of the material is substantially independent of the lithium intercalation concentration. In preferred embodiments, the electrolyte structure has a thickness in the range of 50–100 micrometers.

In a preferred embodiments, the layered crystalline material is a powder. The particle size of the powder is in the range of 40–100 μm and each such particle is a mono-crystal. The cathode can be a pressed powder compact of the mono-crystalline particles. When the cathode is a pressed powder, a binder is preferably included. Polyethylene is a preferred binder. The binder is less than or equal to 5% of the total cathode. The cathode can include additional materials, such as CuO or $Bi_2O_3$, to further modify the energy storage capacity of the device. CuO or $Bi_2O_3$ can be present in the range of 30-60 weight percent.

In a preferred embodiment, the energy storage device can be recharged by de-intercalation of the anode species from the van der Waals channels. The device can be subjected to repeated intercalation and deintercalation cycles, which effects the charging and discharging of the device. In another preferred embodiment, the energy storage device is operated at a temperature in the range of $-60°$ C.$\leq T \leq 90°$ C.

DESCRIPTION OF THE PREFERRED EMBODIMENT

We begin with a brief description of the electrochemical principles and solid state physics underlying the invention, which is the subject of a co-pending application entitled "Layered Crystalline Materials Capable of High Guest Loading" filed on this day and herein incorporated by reference. Operation of the claimed energy storage device is based on the fact that the guest particles occupy van der Waals channels in a layered crystal host and redistribution of the ions and electrons within the guest-host lattice generates electric current.

Figure 1:
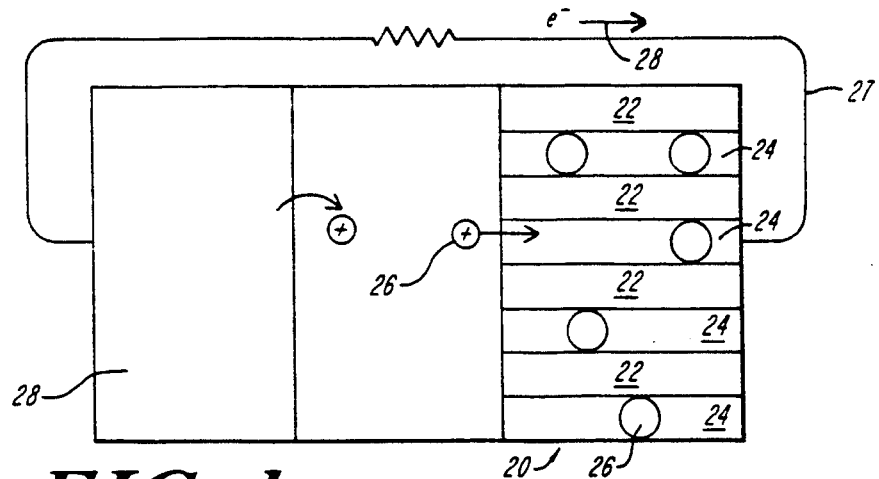
FIG. 1 is a schematic representation of the electrochemical cell for the intercalation of guest species in the layered host $G_xMe_yCh_z$.

A schematic representation of the electrochemical cell used for the intercalation of a guest species into a host is shown in FIG. 1. A host 20 contains layers 22 which define van der Waals channels 24. Anode species 26 are capable of occupying localized sites in the van der Waals channels. During operation of the electrochemical cell, oxidation at an anode 28 provides the positively charged anode species. As the charged anode species 26 intercalates into the van der Waals channels 24, an external circuit 27 provides the required negative charge to the crystalline lattice of the layered host 22 to maintain charge neutrality, thereby driving the current flow in the direction indicated by arrow 28. Hence, the greater the loading capacity or intercalating capacity of the host for the anode species, the greater the charge that can be passed through the external circuit.

Structure

The bismuth chalcogenide family is known to crystallize in a rhombohedral and hexagonal lattice. The hexagonal and rhombohedral crystal lattices possess two types of energetically accessible sites which permit localization of the guest species within the van der Waals channel. The basis for this observation has been presented in a co-pending application U.S. Ser. No. 07/784,525, herein incorporated by reference.

Figure 2:
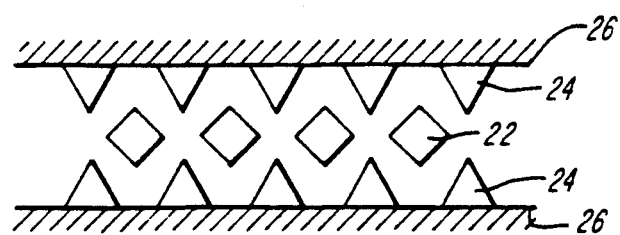
FIG. 2 is a schematic illustration of the localized sites in the van der Waals channels for the crystal lattice structures used in the present invention.

FIG. 2 is a schematic representation of the two types of guest sites. A first site 22 is in the plane of the center of the channel, while a remaining site 24 localizes the guest species along walls 26 of the channel. Total loading of the channel by guest is predicted to be three. Occupation of sites 22 is more energetically favorable at the beginning of intercalation than of sites 24. However, relative energy levels change during the intercalation process. All sites are sufficiently close in energy that "hopping" of guests from one to another site of differing energy is possible. The guest species behave as a "lattice gas".

The conventional model would seem to suggest, therefore, that the upper limit to guest loading without distortion of the lattice is three. We have discovered that much higher loading is possible. For the specified lattice types shown in FIG. 2, orbital interaction in a filled van der Waals channel results in increased guest-guest interaction and a decrease in the average guest-guest interatomic distance. This conversion from occupation of localized energy minima to free movement throughout the van der Waals channel is equivalent to a phase change. The lattice gas condenses into a high density state, which is defined herein as a "quasi-liquid phase".

Because the new phase has a smaller average interatomic distance, additional guests can be introduced without distortion of the crystal lattice. Hence, a loading capacity of three is no longer a limitation to the system and rapid and high levels of guest loading is now possible. Loading capacity of lithium of up to eight and nine have been observed in the bismuth chalcogenide compounds of this invention. We estimate that the loading capacity can be even higher; in particular, capacity of up to ten is considered possible.

The class of compounds of the present invention has stable crystalline phases of hexagonal or rhombohedral symmetry which can be prepared with minimal defect densities and appropriate impurity distribution. The $Bi_2Ch_3$ class of compounds may crystallize in a rhombohedral unit cell of space group $D^5_{3d}$ (R3m, $a_0=9.83$ Å; $\alpha=24.4°$ for bismuth selenide) containing five atoms. This crystal structure consists of layers formed by equal atoms in hexagonal arrangement. A hexagonal unit cell for bismuth selenide ($a_0=4.14°$; $c_0=28.55°$) also has been identified.

In a battery, the discharge curve is directly affected by $\Delta G$ of the cathode material (a bismuth chalcogenide). The following thermodynamic parameters which are related to the Gibbs free energy must be considered when evaluating a guest/host combination: the change in entropy ($\Delta S$) of distribution of the host/guest atoms, the energy of guest-guest and guest-host interactions, the change in the Fermi energy ($\Delta F_e$), and the lattice distortion ($L_D$).

The lattice gas to quasi-liquid condensation of the system prevents significant distortion of the lattice. In the present case, loading over the range of intercalation from 0 to 8 or 9 results in distortion only in the range of 2-3%. Such distortion does not contribute significantly to the Gibbs free energy of the system. Distortion should not exceed 10%. In contrast, the c-axis of $Li_x$-$TiS_2$, i.e., the axis perpendicular to the van der Waals channel, increases by 10% from x=0 to x=1. The change in entropy is significant only in the early stages of the intercalation process. $\Delta S$ is therefore very small over the course of the process and need not be considered in the Gibbs free energy equation.

The characteristics of the crystal lattice have a great effect on the remaining two thermodynamic parameters, however. The energy of interaction, $E_{int}$, is a measurement of guest-guest and guest-host interactions. Both of these are greatly affected by lattice crystalline characteristics. If the crystal lattice contains significant levels of defects and/or dislocations or has a sufficiently uneven distribution of defects, the energy minima associated with the localized sites will be disrupted and filling is not uniform along the length of the channel. Fermi energy level of the crystal is also effected by the interstitial and lattice site impurities and the lattice structure. The defect or impurity distribution is important in identifying acceptable crystalline purity. If all defects are clustered neat the entrance to van der Waals channels, no guests can enter and guest capacity is low even though crystalline lattice purity is high. It is apparent therefore, the careful crystal growth is important to preparing layered crystalline materials capable of the high loading of the present invention.

The energy storage cell of the present invention uses a bismuth chalcogenide of high crystalline purity and controlled lattice characteristics as an electroactive material. The cell possesses improved electrical properties and reduced processing costs. The energy storage system of the present invention represents a greater than 50% increase in capacity over traditional ZnHg/KOH/AgO. Specific volume capacity is increased more than two-fold over the $Li_xTiS_2$/LiClO$_4$/Li cell described in U.S. Pat. No. 4,009,052. Furthermore, the cathode materials are of low toxicity and have minimal environmental impact, high voltage stability and improved performance at lower temperatures as compared to traditional batteries.

Process

The following detailed description is presented to provide details of a crystal growth process of the highly defect-free layered crystalline materials with controlled lattice characteristics such as impurity distribution to be used in the energy storage device of the present invention. The description is not intended to limit the scope of the present invention.

Stoichiometric quantities of highly purified (99.9999% pure) bismuth and chalcogenide are charged into a quartz ampoule. If necessary, the materials are zone refined before use. Off-stoichiometry results in an n- or p-doped material with characteristic degradation of the lattice structure and the associated performance. The ampoule is evacuated to $10^{-7}$ mmHg and backfilled to a pressure of $10^{-3}$ mmHg with a small amount of inert gas, such as argon, or a reducing gas, such as hydrogen (3–10 cycles), and then sealed. Hydrogen is particularly preferred because it reacts with oxygen during processing to prevent oxidation and decrease the segregation of chalcogenide by reducing its vapor pressure.

A highly homogeneous polycrystalline material is prepared in a first processing step. The sealed ampoule is placed in a furnace at room temperature and heated to a temperature 5°–10° C. above its melting point. The ramp rate, temperature and reaction time are selected for the final compound. The reaction conditions are listed in Table I for the preparation of polycrystalline $Bi_2S_3$, $Bi_2Se_3$, and $Bi_2Te_3$. The temperature of the furnace over the entire length of the ampoule is controlled to within ±0.5° C. Careful and accurate control of the temperature is important because of the high volatility of chalcogenides. Temperature variation along the ampoule length causes segregation of chalcogenide which leads to off-stoichiometry. To optimize the temperature control along the length of the ampoule, a long furnace can be used. Additional heating coils can be used at furnace ends to reduce the temperature gradient at the furnace exits.

TABLE I

Processing conditions for polycrystalline material.

| processing conditions | $Bi_2Te_3$ | $Bi_2Se_3$ | $Bi_2S_3$ |
|---|---|---|---|
| heating rate to $T_{liq}$ (°C./h) | 30 | 20 | 15 |
| exposure time (h) at $T_{liq}$ + 10° C. | 10 | 15 | 20 |
| cooling rate (°C./h) | 50 | 40 | 35 |

During the last hour of reaction time, the ampoule is agitated or vibrated to insure complete mixing of the ampoule components. The ampoule vibration preferably is in the range of 25–100 Hz and is accomplished by fixing one end of the ampoule to an oscillation source. Any conventional vibration means is contemplated by the present invention. After reaction is complete, the ampoule is cooled at a slow controlled rate.

Once a homogeneous polycrystalline material is obtained, it can be further processed into a highly defect-free bismuth chalcogenide single crystal. Any known method of growing single crystals can be used, such as Bridgeman techniques, Czolchralski process and zone refinement techniques (recrystallization). In particular zone refinement has proved to be highly effective in obtaining high purity single crystals.

Figure 3:
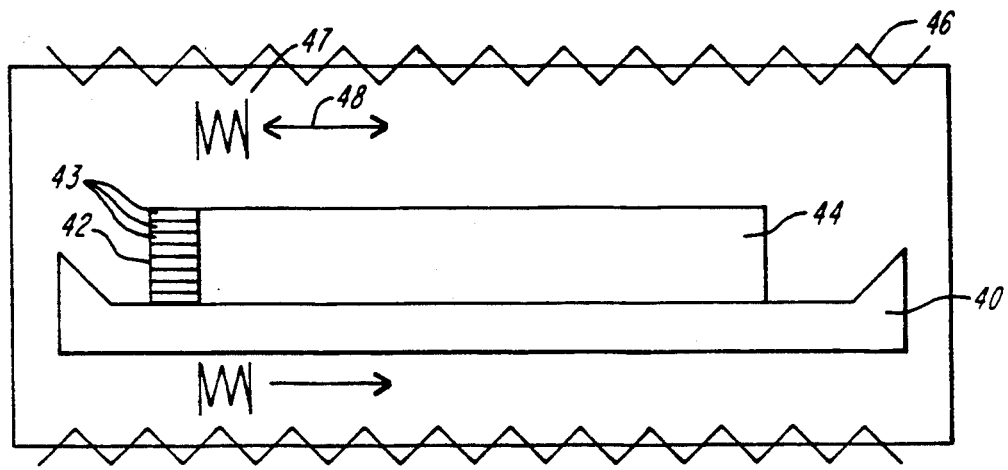
FIG. 3 is a cross-sectional schematic illustration of the zone-refinement apparatus used in preparing single crystals of the present invention.

Referring to FIG. 3, zone refinement is carried out in a quartz boat 40 containing a seed crystal 42 of the desired lattice structure, e.g., the hexagonal lattice structure. It is recommended that clean rooms levels of Class 100 be maintained. The seed crystal 42 is oriented in the boat such that crystal layers 43 are horizontal. The entire apparatus should be shock-mounted to insulate against environmental vibrations. The boule 44 of polycrystalline material is positioned in surface contact with the seed crystal.

The furnace comprise two parts, an outer furnace 46 for maintaining an elevated temperature along the entire boule length and a narrow zone 47 movable in the direction of arrow 48 for heating a small portion of the polycrystalline material. For production of hexagonal structure, the outer furnace 46 is maintained at 35° C. below the melting point, and the zone 47, which is 2–3 cm in length, is held at 10° C. above the melting point of the polycrystalline material. Unlike for the preparation of the polycrystalline material in the first processing step, the boule can in this step be rapidly heated to the operating temperature. The zone is initially positioned at the seed crystal/boule interface and this region is heated to the melting point of the material. The zone 47 is then moved slowly down the length of the boule. Zone travel rate is selected according to the particular composition and recommended rates are shown, along with other processing parameters, in Table II. Zone travel rate is an important processing parameter. If the rate is too great, crystallization is incomplete and defects are formed. If the rate is too slow, layer distortions result. The lower portion of the heat-treated boule in contact with the quartz boat is preferably removed before use. The process produces a single crystalline material having less than $10^{12}/cm^3$ defect density and an impurity distribution which is inversely proportional to the intended direction of intercalation. The single crystal typically contains $10^6$ layers/ram with a spacing of 3–4 Å/layer.

TABLE II

Processing conditions for hexagonal single crystal growth.

| processing conditions | $Bi_2Te_3$ | $Bi_2Se_3$ | $Bi_2S_3$ |
|---|---|---|---|
| boule temperature | $M_p - 35°$ C. | $M_p - 35°$ C. | $M_p - 35°$ C. |
| zone temperature | $M_p + 10°$ C. | $M_p + 10°$ C. | $M_p + 10°$ C. |
| zone travel rate | 8 mm/hr | 6 mm/hr | 3 mm/hr |
| cooling rate | 50° C./hr | 40° C./hr | 35° C./hr |

The above process can be modified slightly to produce crystals of rhombohedral structure, in which case the seed crystal used in the zone refinement process should be of the rhombohedral structure. In addition, to produce rhombohedral crystals, the furnace temperature is held at 30° C. below the melting point and the zone is maintained at the melting point of the polycrystalline material.

Depending on the composition of the material, there is a preference for either hexagonal or rhombohedral lattice structure. This is summarized below in Table III.

TABLE III

Preferred lattice structure for bismuth chalcogenide.

| lattice structure | $Bi_2Te_3$ | $Bi_2Se_3$ | $Bi_2S_3$ |
|---|---|---|---|
| rhombohedral | — | — | X |
| hexagonal | X | X | — |

Further reference in the specification to these materials as prepared by the above method is made to "defect-free chalcogenide materials".

An energy storage device of the present invention is prepared using an anode which includes an electroactive species capable of intercalating into the van der Waals channels of the defect-free chalcogenide material, a non-aqueous electrolyte solution, preferably containing the anode species and a cathode containing the defect-free chalcogenide material having the appropriate impurity distribution. The anode material preferably is a Group Ia element. A most preferable species is lithium foil.

The electrolyte can be a solid or a liquid. It is not chemically reactive with either the anode or the cathode and is capable of transport of the anode species for intercalation of the cathode during discharge. In preferred embodiments, the electrolyte contains the electroactive species of the anode. In one preferred embodiment, the anode is lithium and the electrolyte is a lithium-containing species. Lithium perchlorate is most preferred.

The need for defect-free chalcogenide material for superior battery performance has been discussed above. Chalcogenide materials are good electronic conductors and can serve as their own current collectors. During discharge of the stored energy of the prepared device and generation of a current in an external circuit, the anode species is transported across the electrolyte region and intercalated into the van der Waals channels between the layers of the chalcogenide material. In the charged state, the chalcogenide material of the cathode either does not contain any intercalated anode species or, preferably, contains a small amount of anode species in the cathode layers.

It is preferable to intercalate a small amount of lithium prior to discharge to provide level discharge voltage from the onset of discharge. In a system containing no pre-intercalated lithium, the working potential rapidly drops during the initial intercalation and approaches some stable value, where it remains substantially constant for the use time of the device.

Figure 4A:
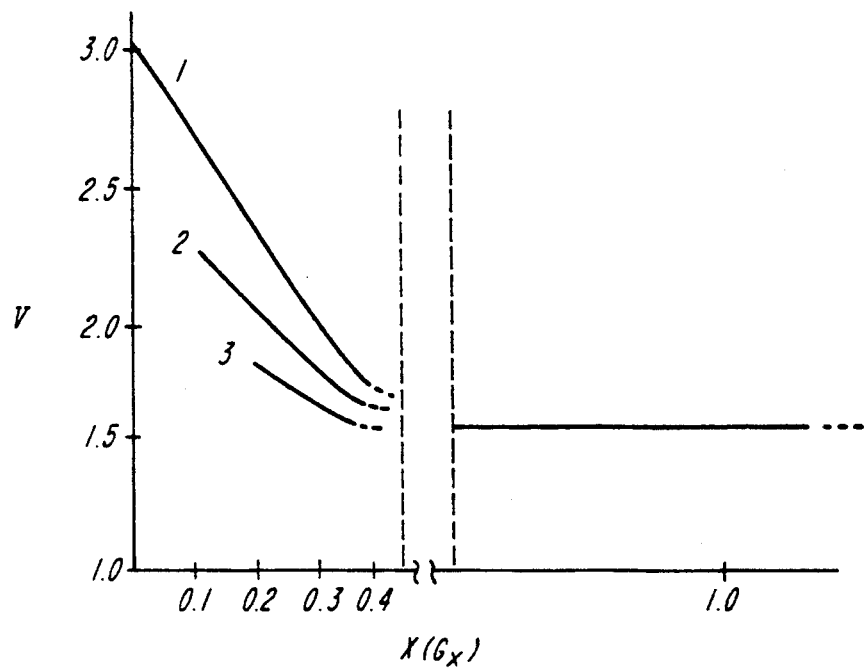
FIG. 4 illustrates the characteristic discharge voltage of $Li_xBi_2Ch_3$ compounds prepared according to the present invention illustrating dependence on (A) the mount of pre-intercalated guest (x); (1) x=0.0, (2) x=0.1, (3) x=0.2 and (B) the nature of the chalcogenide component; (I) Ch=Te, (II) Ch=Se, (III) Ch=S and (IV) Ch=O.
Figure 4B:
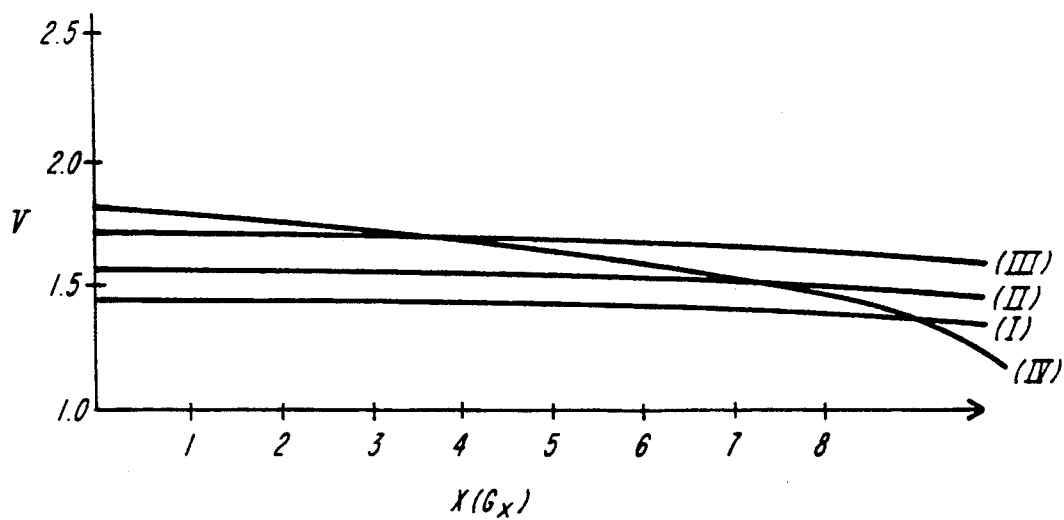

An example of the influence of lithium incorporation on initial battery cell voltage on the basis of $Li_xBi_2Ch_3$ is given in FIG. 4. Referring to the curves in Region A of FIG. 4, curves 1, 2 and 3 represent the discharge voltage value of $Li_xBi_2Ch_3$-containing cells for x=0.0, 0.1 and 0.2, respectively. Initial rapid voltage drops can be avoided by pre-intercalating the cathode before use. The addition of lithium is preferably in the range $0.0 < x \leq 0.4$. A pre-intercalated cathode can be prepared, for example, by diffusion of lithium into the van der Waals regions from a 1.0M solution of n-butyllithium in hexane.

The class of defect-free chalcogenide materials of the present invention have a working potential in the range of 1.3 to 1.9V. The working potential of each chalcogenide material varies slightly and the chalcogenide material can be selected to tailor the working potential of the device. Solid solutions of chalcogenide materials further provide a spectrum of working voltages. Referring to Region B in FIG. 4, the influence of the chalcogenide component (Ch) of the compound on the average discharge voltage ($V_{av}$) is shown. In this region, the discharge voltage is "substantially independent" of intercalant concentration, x. "Substantially independent" is defined as a voltage change of less than 0.3V upon intercalation of up to 8 moles lithium per mole of the chalcogenide compound. The average discharge voltage does increase from tellurium to sulfur; however, each as a characteristic working potential: $Bi_2S_3$, 1.7–1.9V; $Bi_2Se_3$, 1.5–1.7V; and $Bi_2Te_3$, 1.3–1.5V. As can be seen by curve IV in FIG. 4b, bismuth oxide does not behave like the other chalcogenide materials, that is, the working potential varies with lithium concentration. For the chalcogenide materials used in the invention, however, discharge voltage remains substantially unchanged until the capacity has been exhausted, which is a further indication of the independence of $\Delta G$ on lithium concentration.

Chalcogenide compounds can also be used with other materials, to modify performance characteristics of the cathode. For example, a composite of copper oxide and chalcogenide compound imparts improved evenness of discharge and voltage control until capacity of the cell has been exhausted.

In a preferred embodiment, the crystal can be further ground into particles for use in devices, each particle being a mono-crystal. A grinding techniques is selected so as to not introduce many defects and dislocations into the crystal. However, because of the weakness of the van der Waals attractive force, the crystal cleaves readily along the length of the channel without much danger of lattice distortion. The powder preferably has a particle size in the range of 40–100 μm. Even in micron-sized crystalline domains, a sufficient number of layers exist to allow efficient intercalation of the anode species into the van der Waals regions.

Energy Storage Device Assembly

An energy storage device 10 with a diameter in the range of 8.0–9.5 mm and height in the range of 0.7–2.5 mm is prepared using defect-free chalcogenide materials.

The anode is prepared from a foil of lithium metal from which an electrode with the desired dimensions can be cut. It is preferred to cut the lithium foil while the foil is submerged in the electrolytic solution.

Suitable electrolyte solutions can be prepared using lithium salts of $PF_6^-$, $BF_4^-$ and $AsF_6^-$. Suitable solvents include non-aqueous solvent such as tetrahydrofuran, dimethylformamide, acetonitrile and ethylene and propylene carbonate. The electrolyte is preferably 1.0M lithium perchlorate in propylene carbonate or dimethoxyethane or 80/20 propylene carbonate/dimethoxyethane.

The cathode containing a defect-free chalcogenide material is prepared as a powder compact. The powder compact may be formed under heat and pressure to form a porous electrode. A binder, such as polyethylene or a Teflon, may be used in the forming process. Preferably the binder load is $\leq 5\%$ w/w. CuO in the range of 30–60 weight percent can be introduced as a powder to the crystalline bismuth chalcogenide powder to obtain a composite cathode, if desired.

Figure 5:
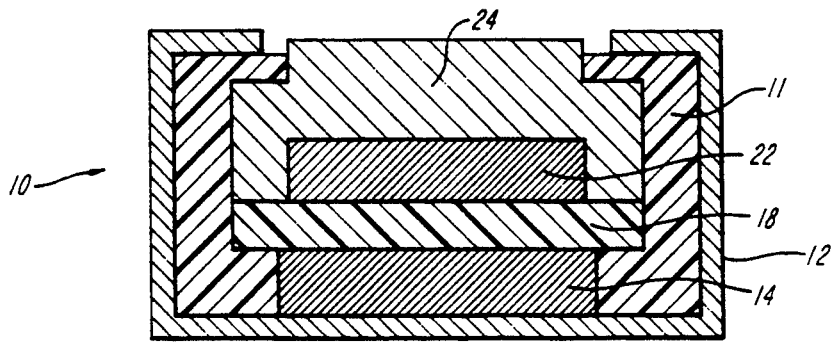
FIG. 5 shows a cross-sectional schematic illustration of an assembled energy storage device.

Referring to FIG. 5, a polypropylene spacer 11 is placed in a lower metal housing 12 and a cathode 14 is placed into a space provided in the spacer 11. A separator 18 is placed over the cathode 14. The separator is typically made of unwoven polypropylene. An electrolyte solution containing 1.0M $LiClO_4$ is added to the spacer 18. Sufficient solution is added to create a contact between the cathode 14 and separator 18. An lithium pellet 22 is placed on top of the separator 18 and a metal cap 24 is place over the anode pellet 22 such that it fits slightly within the lower metal housing 12 as depicted in FIG. 5. The entire assembly is pressed closed to afford an energy storage device 10.

Testing

Figure 6:
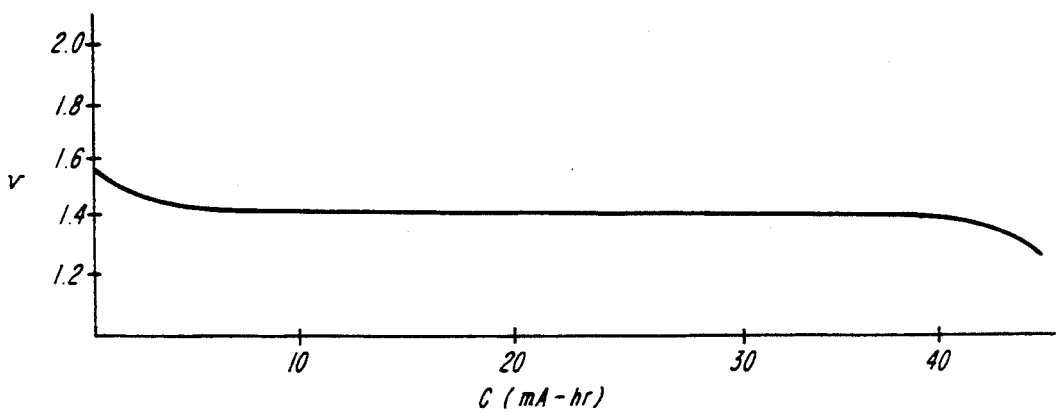
FIG. 6 shows the discharge characteristic of a composite cathode material.

The energy storage device was discharged to a constant load resistance ($R_l$) of 30 K$\Omega$. Charge voltage was periodically monitored by voltmeter. Discharge was continued until voltage reached a threshold of $V_{dis}=1.2V$, a point beyond which the device is no longer useful for most applications. The average voltage ($V_{av}$) was determined when $V_{dis}=1.2V$ was attained. The total charge was determined by the relationship, $C_{dis}=i_{av} t_{dis}$, where $t_{dis}$ is the total discharge time. The profile of discharge voltage dependence during discharge is given in FIG. 6, showing a device capacity of at least 45 mA-h. A device as prepared above has energy of 1000–1300 Wh/dm$^3$. Capacities can be increased by optimizing the composition of the active compounds, for example, by alloying the anode with elements such as aluminum and/or calcium or by using the antimony system.

The cathode can be at least partially reversibly charged and discharged. Carbon-intercalated lithium anodes are contemplated, particularly for use in reversible systems. Most of the limitations of the system appear to be due to the metal lithium electrode and are caused by formation of irreversible reactions with the electrolyte. The intercalation electrode itself is highly reversible because the host retains its structure during the intercalation/de-intercalation process. One thousand cycles are theoretically possible.

What is claimed is:

1. Energy storage device, comprising:
   an anode including at least one species selected from the group consisting of Group Ia elements;
   an electrolyte, in contact with the anode, said electrolyte being capable of transporting said species through the electrolyte; and
   a cathode in electrical contact with said electrolyte, said cathode comprising a layered crystalline material of the formula $G_xMe_yCh_z$, where G is at least one guest element selected from the group consisting of Group Ia elements and $0.0 \leq x \leq 10$; Me is selected from the group consisting of Bi and Sb and $y=1, 2$; and Ch is a chalcogen element selected from the group consisting of S, Se and Te, and $z=1, 2, 3$; whereby said material has a sufficiently low defect density and appropriate impurity distribution, together sufficient to permit intercalation of at least 3 moles of lithium within van der Waals channels per one mole of said material without significant distortion of the lattice, said material further characterized in that $\Delta G$ is substantially independent of the lithium intercalation concentration.

2. The energy storage device of claim 1, wherein said cathode comprises a solid solution of more than one compound of the formula $G_xMe_yCh_z$; where G is a Group IA element; $0 \leq x \leq 10$; Me is selected from the group consisting of Bi and Sb and $y=1, 2$; and Ch is a chalcogen element selected from the group consisting of S, Se and Te, and $z=1, 2, 3$.

3. The energy storage device of claim 1, wherein said cathode comprises a composite material of more than one compound of the formula $G_xMe_yCh_z$, where G is the anodic species, $0.0 \leq x \leq 10$, Me is selected from the group consisting of Bi and Sb and $y=1, 2$; and Ch is a chalcogen element selected from the group consisting of S, Se and Te, and $z=1, 2, 3$.

4. The energy storage device of claim 1, wherein the anode includes species selected from the group comprising lithium, sodium and potassium and their alloys.

5. The energy storage system of claim 1, wherein said anode comprises aluminum-lithium alloy.

6. The energy storage device of claim 1, wherein said device is discharged by the intercalation of said anode species into the van der Waals channels of said layered crystalline material to form $G_xMe_yCh_z$, where the source of G is the anode and $0.4 \leq x \leq 10$; Me is selected from the group consisting of Bi and Sb and $y=1, 2$; and Ch is a chalcogen element selected from the group consisting of S, Se and Te, and $z=1, 2, 3$.

7. The energy storage device of claim 1, wherein said device is charged by the de-intercalation of said anode species out of the van der Waals channels of said layered crystalline material to form $G_xMe_yCh_z$, where G is the anode species, $0.0 \leq x \leq 0.4$; Me is selected from the group consisting of Bi and Sb and $y=1, 2$; and Ch is a chalcogen element selected from the group consisting of S, Se and Te, and $z=1, 2, 3$.

8. The energy storage device of claim 1, wherein said device comprises a lithium anode, a lithium perchlorate electrolyte solution and a cathode comprising $Li_x Bi_2Ch_3$, where $0.0 \leq x \leq 10$; and Ch is selected from the group consisting of S, Se and Te.

9. An energy storage device, comprising:
   a lithium anode;

an electrolyte structure having a first surface in contact with the anode, said electrolyte structure comprising unwoven polypropylene impregnated with an electrolyte, said electrolyte including lithium;

a cathode in contact with a second surface of said electrolyte structure, said cathode comprising a layered crystalline material of the formula $Li_x Bi_y Ch_z$, where Ch is a chalcogenide element selected from the group consisting of S, Se and Te, $0.0 \leq x \leq 10$; $y=1, 2$; and $z=1, 2, 3$; whereby said material has a sufficiently low defect density and appropriate impurity distribution, together sufficient to permit intercalation of at least 3 moles of lithium within van der Waals channels per one mole of said material without significant distortion of the lattice, said material further characterized in that $\Delta G$ is substantially independent of the lithium intercalant concentration.

10. The energy storage device of claim 1 or 9 wherein said anode is a lithium foil.

11. The energy storage device of claim 10 wherein said lithium foil is cut for use as said anode under an electrolyte solution.

12. The energy storage device of claim 1 or 9 wherein said cathode is a pressed powder compact comprising said layered crystalline material.

13. The energy storage device of claim 1 or 9 wherein each particle in said pressed powder is a mono-crystal.

14. The energy storage device of claim 13, wherein said particles have a size in the range of 40–100 μm.

15. The energy storage device of claim 12, wherein said powder compact further includes a binder.

16. The energy storage device of claim 15 wherein the binder comprises $\leq 5\%$ wt of the cathode.

17. The energy storage device of claim 1 or 9 wherein said electrolyte is $LiClO_4$.

18. The energy storage device of claim 1 or 9 wherein said cathode further comprises CuO.

19. The energy storage device of claim 18 wherein said CuO is in the range of 30–60 weight percent.

20. The energy storage device of claim 1 or 9 wherein said device can be subjected to repeated intercalation and de-intercalation of said anode species in the van der Waals channels of said layered crystalline material.

21. The energy storage device of claim 9 wherein the electrolyte structure has a thickness in the range of 60–100 micrometers.

22. The energy storage device of claim 1 or 9 characterized by a stable discharge voltage over an intercalation range of 0.4 to 8 mole anode species.

23. The energy storage device of claim 1 or 9 wherein said discharge voltage varies no more than 0.3V over an intercalation range of 0.4 to 8 mole anode species.

24. The energy storage device of claim 1 or 9 wherein said device is operated at a temperature in the range of $-60° C. \leq T \leq 90° C.$ 25. The energy storage device of claim 1 or 9 wherein said cathode further includes $Bi_2O_3$.

26. The energy storage device of claim 25 wherein said $Bi_2O_3$ is in the range of 30–60 weight percent.

27. An energy storage device, comprising:
an anode including at least one species selected from the group consisting of Group Ia elements;
an electrolyte, in contact with the anode, said electrolyte being capable of transporting said species through the electrolyte; and a cathode in electrical contact with said electrolyte, said cathode comprising a layered crystalline material of the formula $G_x Me_y Ch_z$, where G is at least one guest element selected from the group consisting of Group IA elements and $0.0 \leq x \leq 10$; Me is selected from the group consisting of Bi and Sb and $y=1, 2$; and Ch is a chalcogen element selected from the group consisting of S, Se, and Te and $z=1, 2, 3$; whereby said material has a sufficiently low defect density and impurity distribution that the energy storage device is characterized by a stable discharge voltage over an intercalation range of 0.4 to 8 mole anode species.

28. The energy storage device of claim 27, wherein said sufficiently low defect density and impurity distribution are together sufficient to permit intercalation of at least 3 moles of lithium within van der Waals channels per one mole of said crystalline material without significant distortion of the lattice.

29. The energy storage device of claim 27, wherein said cathode comprises a solid solution of more than one compound of the formula $G_x Me_y Ch_z$; where G is a Group IA element; $0 \leq x \leq 10$; Me is selected from the group consisting of Bi and Sb and $y=1, 2$; and Ch is a chalcogen element selected from the group consisting of S, Se and Te, and $z=1, 2, 3$.

30. The energy storage device of claim 27, wherein said cathode comprises a composite material of more than one compound of the formula $G_x Me_y Ch_z$, where G is the anodic species, $0.0 \leq x \leq 10$, Me is selected from the group consisting of Bi and Sb and $y=1, 2$; and Ch is a chalcogen element selected from the group consisting of S, Se and Te, and $z=1, 2, 3$.

31. The energy storage device of claim 27, wherein the anode includes species selected from the group comprising lithium, sodium and potassium and their alloys.

32. The energy storage system of claim 27, wherein said anode comprises aluminumlithium alloy.

33. The energy storage device of claim 27, wherein said device is discharged by the intercalation of said anode species into the van der Waals channels of said layered crystalline material to form $G_x Me_y Ch_z$, where the source of G is the anode and $0.4 \leq x \leq 10$; Me is selected from the group consisting of Bi and Sb and $y=1, 2$; and Ch is a chalcogen element selected from the group consisting of S, Se and Te, and $z=1, 2, 3$.

34. The energy storage device of claim 27, wherein said device is charged by the deintercalation of said anode species out of the van der Waals channels of said layered crystalline material to form $G_x Me_y Ch_z$, where G is the anode species, $0.0 \leq x \leq 0.4$; Me is selected from the group consisting of Bi and Sb and $y=1, 2$; and Ch is a chalcogen element selected from the group consisting of of S, Se and Te, and $z=1, 2, 3$.

35. The energy storage device of claim 27, wherein said device comprises a lithium anode, a lithium percholorate electrolyte solution and a cathode comprising $Li_x Bi_2 Ch_3$, where $0.0 \leq x \leq 10$; and Ch is selected from the group consisting of S, Se and Te.

36. The energy storage device of claim 27 wherein said anode is a lithium foil.

37. The energy storage device of claim 27 wherein said cathode is a pressed powder compact comprising said layered crystalline material.

38. The energy storage device of claim 27 wherein said electrolyte is $LiClO_4$.

39. The energy storage device of claim 27 wherein said cathode further comprises CuO.

40. The energy storage device of claim 27 wherein said device can be subjected to repeated intercalation and de-intercalation of said anode species in the van der Waals channels of said layered crystalline material.

41. The energy storage device of claim 27 wherein said discharge voltage varies no more than 0.3V over an intercalation range of 0.4 to 8 mole anode species.

42. The energy storage device of claim 27 wherein said device is operated at a temperature in the range of $-60° C. \leqq T \leqq 90° C.$

43. The energy storage device of claim 27 wherein said cathode further includes $Bi_2O_3$.

* * * * *